April 6, 1954
M. L. WITTER
2,674,258
AIR VOLUME AND PRESSURE CONTROLLING
DEVICE FOR WATER STORAGE TANKS
Filed May 22, 1953
2 Sheets-Sheet 1
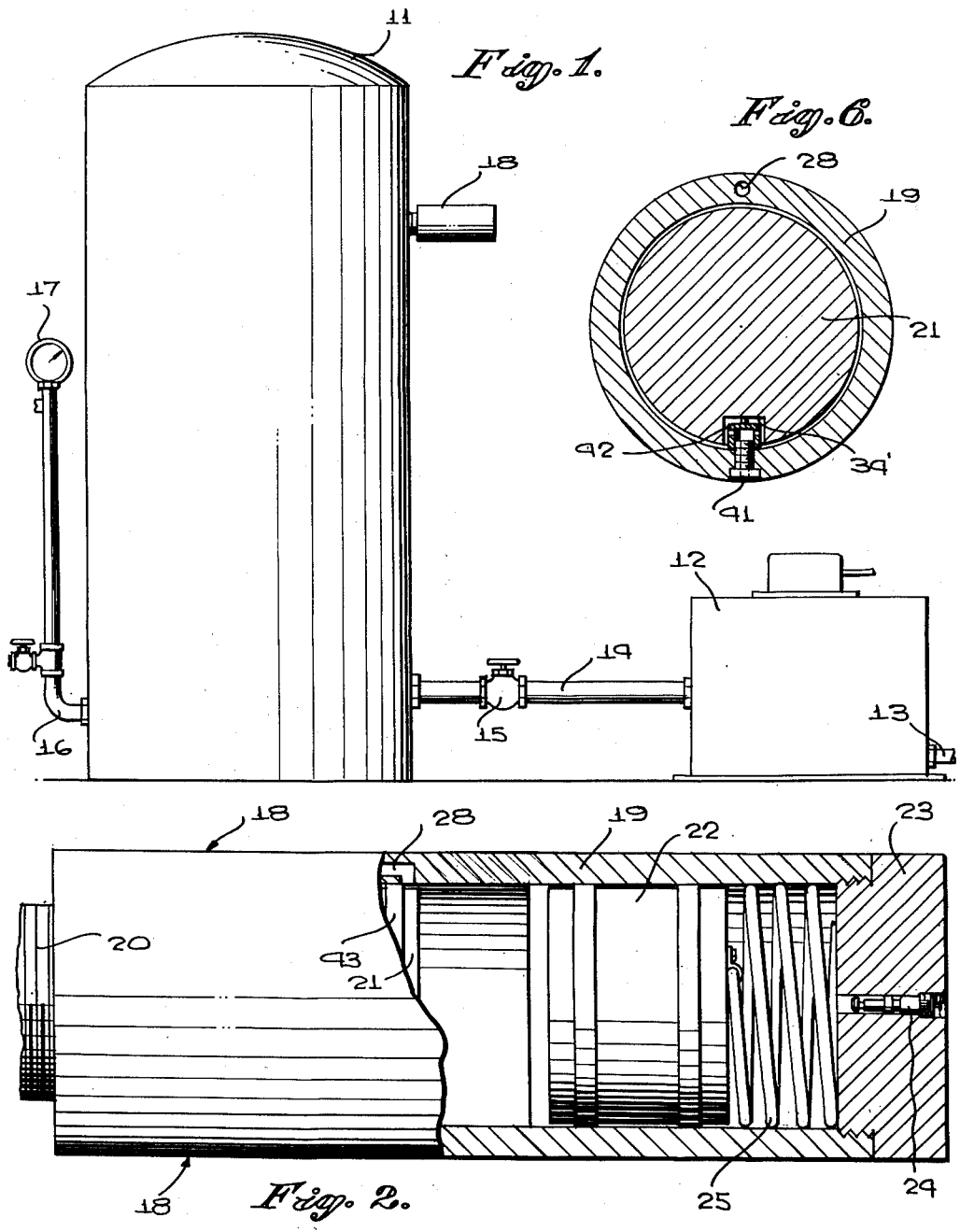
INVENTOR.
MELVIN L. WITTER
BY
McMorrow, Berman & Davidson
ATTORNEYS

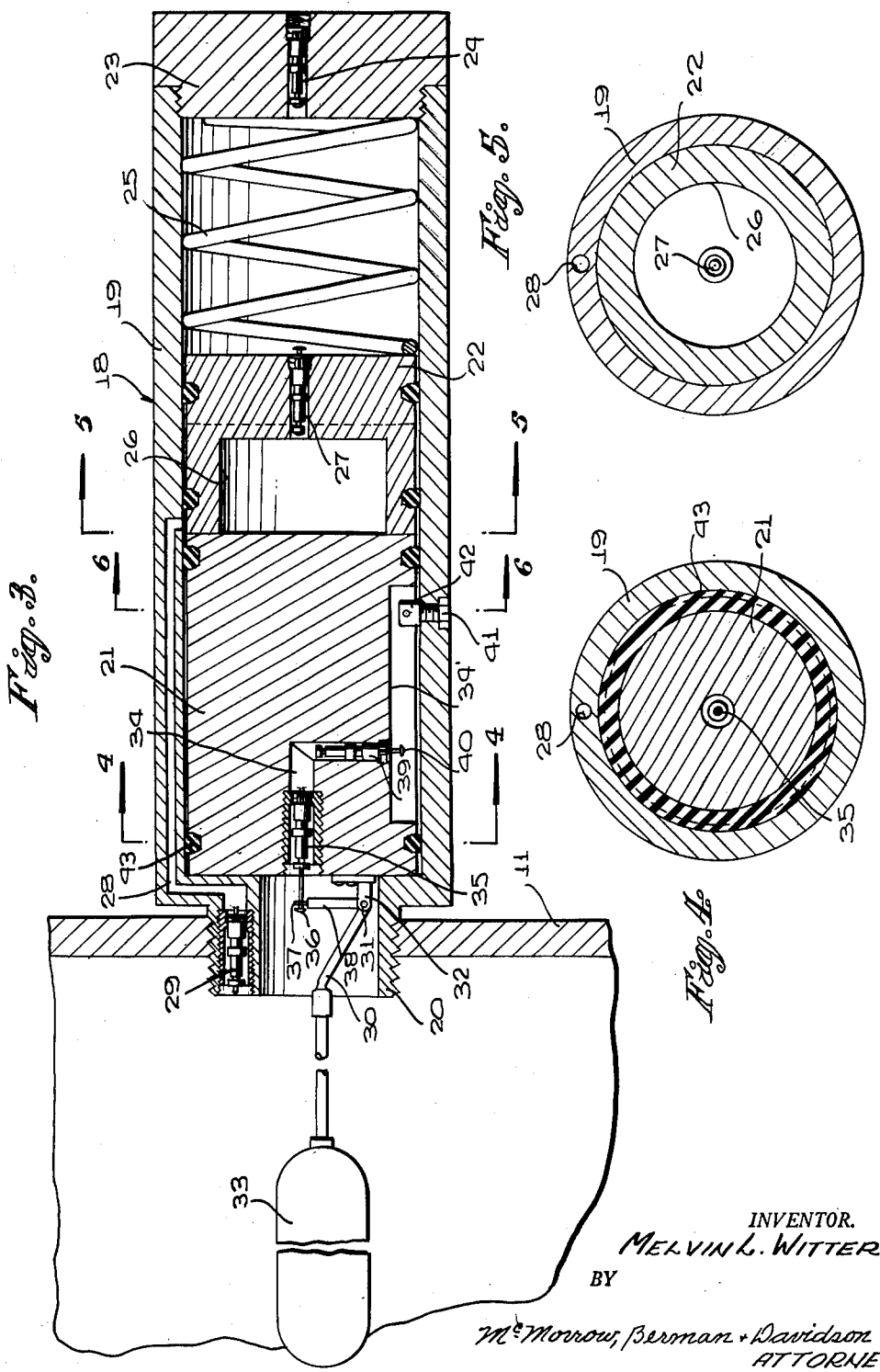

Patented Apr. 6, 1954

2,674,258

UNITED STATES PATENT OFFICE 2,674,258

AIR VOLUME AND PRESSURE CONTROLLING DEVICE FOR WATER STORAGE TANKS

Melvin L. Witter, Big Spring, Tex., assignor of one-fourth to M. L. Kirschbaum and Robert Kirschbaum, Colorado City, Tex.

Application May 22, 1953, Serial No. 356,776

3 Claims. (Cl. 137—209)

This invention relates to air volume and pressure controlling devices for water storage tanks, and more particularly to a device adapted for use with a water storage tank for automatically controlling the height of water in the tank and for controlling the pressure and volume of air in the upper portion of the water tank.

A main object of the invention is to provide a novel and improved air regulator for water storage tanks which automatically introduces air into the tank independently of the water pump associated therewith and automatically regulates the air pressure in the tank, the regulator being simple in construction, involving only a few parts, and being reliable in operation.

A further object of the invention is to provide an improved air regulator for water storage tanks which affords an ample air charge for all sizes of standard tanks with automatic means for releasing any excess air, the device being suitable for use on any type of standard water tank regardless of the size of the pump employed or the size or design of the tank, the improved regulator device being inexpensive to manufacture, being sturdy in construction, involving readily available materials for its components, and requiring no connections to the suction side of the pump employed with the water storage tank.

A still further object of the invention is to provide an improved air regulator for controlling the volume and pressure of air in the upper portion of a water storage tank, the device being usable on water storage tanks operating in conjunction with either shallow well pumps or with deep well pumps, regardless of the size or type of the pump employed, the device being usable with a pneumatic tank which employs a centrifugal pump or any other conventional type of pump, the device operating automatically and independently of the pump and providing a means of controlling and regulating the pressure and volume of the air in the upper part of the storage tank without requiring the air to be handled by the water pump or any other part of the installation.

Further objects and advantages of the invention will become apparent from the following description and claims, and from the accompanying drawings, wherein:

Figure 1 is a side elevational view of a typical water storage tank and water pump connected thereto, the tank being provided with an improved air volume and pressure controlling device constructed in accordance with the present invention;

Figure 2 is an enlarged side elevational view, partly in longitudinal cross-section of the air volume and pressure controlling device employed in Figure 1, showing the air intake piston of the device in a position immediately preceding the suction stroke thereof;

Figure 3 is an enlarged vertical cross-sectional view taken through the air volume and pressure controlling device and a portion of the water tank showing the air intake piston of the device at the end of an initial suction stroke thereof;

Figure 4 is a cross-sectional view taken on the line 4—4 of Figure 3;

Figure 5 is a cross-sectional view taken on the line 5—5 of Figure 3;

Figure 6 is a cross-sectional view taken on the line 6—6 of Figure 3.

Referring to the drawings, 11 designates a water storage tank of conventional construction which is supplied with water by a conventional pump 12. Connected to the pump 12 is a water supply pipe 13 which leads to a well or other water supply source and furnishes water to the inlet side of the pump 12. Designated at 14 is a conduit connected between the outlet side of the pump 12 and the lower portion of the tank 11, a hand-operated valve 15 being provided in the conduit 14, as shown. Designated at 16 is the water service conduit leading from the lower portion of tank 11 to the various service outlets of the water distribution system. Connected to the conduit 16 is a water pressure gauge 17 which indicates the water pressure in the tank 11. The pump 12 is of a conventional type which is provided with automatic control means operating to initiate action of the pump when the pressure in the tank 11 and in the supply conduit 14 drops below a predetermined value, for example, below 20 pounds' pressure, the control means of the pump terminating action thereof when the pressure in tank 11 and conduit 14 rises above a predetermined top limiting value, for example, a value of 40 pounds' water pressure. The details of the pressure-controlled pump 12 form no part of the present invention.

Designated generally at 18 is an improved air pressure and volume regulator according to the present invention which is connected to the upper portion of the tank 11 in the position shown in Figure 1 and in the manner illustrated in Figure 3. As shown in Figure 3, the device 18 comprises a horizontal, cylindrical body 19 having a reduced, externally threaded end 20 which is threadedly engaged in the upper wall portion of tank 11. Slidably mounted in the cylindrical body 19 is a first piston 21 located in the left side portion of the body 19, as viewed in Figure 3, and designated at 22 is a second piston slidably mounted in the cylinder and located to the right of piston 21, as viewed in Figure 3. The outer end wall of the cylinder comprises a plug member 23 which is threadedly secured in the end of the cylindrical body 19 and is provided at its center portion with a check valve 24 opening responsive to suction developed in the right end of the cylinder to admit air therein. Designated at 25 is a large coil spring which is housed in the right end portion of the cylinder 19 and is secured at one end to piston 22 and which bears at its other end upon the end wall 23. Spring 25 biases piston 22 to the left, as viewed in Figure 3, whereby said piston 22 is urged toward the piston 21.

Piston 22 is formed with a large cavity 26 facing piston 21 and is provided with a check valve 27 arranged to open responsive to build up of pressure in the space between piston 22 and end wall 23, whereby air in said space may be transmitted through the piston 22 into the space between piston 22 and piston 21.

The wall of cylinder 19 is formed with a passage 28 leading from the intermediate portion of the cylinder to a check valve 29 mounted in the wall of the reduced end portion 20 and adapted to open responsive to the build-up of a predetermined degree of pressure in the intermediate portion of the cylinder between pistons 21 and 22, whereby air may be transmitted from said intermediate portion into the water tank 11. It will be noted that the inner end of the passage 28 is located a short distance to the right of the end of piston 21 when piston 21 is in the position shown in Figure 3. Passage 28 may therefore be opened only when piston 21 is at the left end of its stroke and piston 22 is moved to the right from the position thereof shown in Figure 3, as by the accumulation of air under pressure in the space between pistons 21 and 22.

Designated at 30 is a bent lever pivoted at 31 to a bracket 32 secured to the lower portion of the left end of piston 21, as shown in Figure 3. Secured to the inclined, forwardly extending arm of the lever 30 is a float 33 whose position is controlled by the water level in the tank 11. Designated at 34 is a passage formed in the piston 21 and communicating with a longitudinally extending recess 34' formed in the side portion of piston 21, as shown in Figure 3. Passage 34 includes an axially extending portion in which is mounted a valve 35 which is normally closed and which is provided with a headed valve rod 36 extending forwardly therefrom into the reduced portion 20 of cylinder 19, the shank of the valve rod 36 slidably engaging in an eye 37 carried by the top end of the upstanding portion 38 of the bent lever 30. When the float 33 is in a depressed position, as when the level of water in tank 11 is below a predetermined value, the eye 37 engages the head of pin 36 and opens valve 35. Mounted in the other end of passage 34 is a valve 39 which is radially positioned, as shown in Figure 3, and which has the protruding pin element 40 extending into recess 34', the valve 39 being normally closed and being arranged to open when pin 40 is pushed inwardly with respect to the valve. Designated at 41 is an exhaust fitting mounted in the wall of cylinder 19 adjacent the right end of recess 34', as viewed in Figure 3, the fitting 41 including an apertured cap 42 which projects into the recess 34' in the path of movement of the valve pin 40 and which is adapted to push the valve pin 40 inwardly when the piston 21 moves to the right in cylinder 19, as viewed in Figure 3. This allows the air in tank 11 to be exhausted from the tank when the water level therein is below the abovementioned, predetermined value by the opening of valve 39 when valve 35 is in an open position resulting from the depression of float 33.

Suitable annular sealing rings 43 are provided on the respective pistons 21 and 22 to prevent flow of air past said pistons.

When the pressure in the tank 11 is at its required value, for example, between 20 and 40 pounds, and when the water level in said tank is at its desired height, the pump 12 is de-energized and the valves 35 and 29 are closed. When the water level and the pressure in the tank 11 drop below their minimum specified values, pump 12 becomes energized and float 33 is in a depressed position, whereby valve 35 is opened. As the pressure inside of tank 11 is built up by the action of the water being pumped therein by pump 12, this pressure forces piston 21 to the right, likewise forcing piston 22 to the right, since piston 22 is held in contact against piston 21 by the action of spring 25. When the upper limiting value of pressure in tank 11 is reached, for example, at 40 pounds pressure, the operation of pump 12 is terminated, leaving pistons 21 and 22 in positions moved to the right from the positions thereof shown in Figure 3, against the compressed spring 25 and against the pressure of air in the space defined between piston 22 and end wall 23. As pressure in tank 11 is lowered by discharge of water through the service line 16, pistons 22 and 21 are forced toward their initial positions, shown in Figure 3, by spring 25. However, some of the air in the space between piston 22 and end wall 23 has been forced into the cavity 26, by the opening of valve 27, and when piston 22 again moves toward the left, suction is developed in the right end of cylinder 19, which draws air into the right end of cylinder 19 through the intake valve 24. When the pressure in tank 11 drops below the lower limiting value, for example, 20 pounds pressure, by the discharge of water through the service line 16, the action of pump 12 is again initiated and the above cycle of operation is repeated. The air drawn into the right end of cylinder 19 is compressed and is forced into the space between pistons 21 and 22 through the valve 27 where it is trapped. After a number of cycles, as above described, have occurred, a build-up of air pressure occurs between pistons 21 and 22 which holds pistons 21 and 22 in separated positions. When the pressure of the air between pistons 21 and 22 exceeds the air pressure in the upper portion of tank 11 by a predetermined value, valve 29 opens, allowing air to escape from between pistons 21 and 22 into the upper portion of tank 11. For example, when the air pressure between pistons 21 and 22 is in excess of the lower limiting value, for example, the value of 20 pounds pressure, the air pressure causes valve 29 to open allowing the trapped air to escape into the upper portion of tank 11.

When the water level in tank 11 is lower than its minimum specified value, valve 35 is held open by the depression of float 33. Each time that piston 21 is moved to the right, under these conditions, the pin element 40 engages the cap 42 of the exhaust fitting 41, opening valve 39 and allowing air to exhaust from the upper portion of tank 11 through passage 34 and through exhaust fitting 41 into the atmosphere. This allows pump 12 to rapidly raise the level of water in tank 11 to the desired height. As soon as this level has been reached, float 33 is raised to a position wherein eye 37 frees the head of pin 36, allowing valve 35 to close, thereby preventing further exhaust of air from the upper portion of tank 11. From this point, the action above described takes place and allows the pressure of air in the upper portion of tank 11 to build up until the tank pressure reaches the upper limiting value, for example, the top limiting value of 40 pounds pressure at which the action of pump 12 is terminated.

It will be therefore apparent that the device 18 operates to maintain a proper volume and pressure of air in the upper portion of tank 11 by introducing a charge of air into the tank each time the pump 12 goes through a pumping cycle, that is, each time the pump 12 is energized by the lowering of the pressure in the tank 11 below the lower limiting value to replenish the water in the tank, each cycle terminating when the upper limiting value of water pressure in the tank is reached.

Figure 2 illustrates the relative positions of pistons 21 and 22 after a substantial build-up of pressure of air between said pistons has occurred and air is about to be discharged from the space between the pistons into the upper portion of the water tank 11.

The check valve 29 serves not only to admit air into the upper portion of tank 11, but also serves the additional purpose of keeping water and air from tank 11 from entering the passage 28 when the pressure in tank 11 is greater than the pressure of the compressed air between pistons 21 and 22.

While a specific embodiment of an improved air volume and pressure controlling device for a water storage tank has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An air volume and pressure controlling device for a water storage tank comprising a cylinder, conduit means at one end wall of the cylinder arranged to be connected to the upper portion of a water storage tank, an air intake check valve in the other end wall of the cylinder, a first piston in said cylinder adjacent said one end wall, a second piston in said cylinder between the first piston and said other end wall, spring means bearing between said second piston and said other end wall, a second check valve in said second piston arranged to admit air under pressure between said pistons, a third check valve in said one end wall, said cylinder being formed with a passage connecting the intermediate portion thereof with said third check valve, said third check valve being arranged to open into the water storage tank responsive to a predetermined value of air pressure in the intermediate portion of the cylinder, a float pivoted to said first piston and extending through said conduit means, and valve means carried by said first piston and controlled by said float, said cylinder being formed with an exhaust port communicating with said valve means.

2. An air volume and pressure controlling device for a water storage tank comprising a cylinder, conduit means at one end wall of the cylinder arranged to be connected to the upper portion of a water supply tank, an air intake check valve in the other end wall of the cylinder, a first piston in said cylinder adjacent said one end wall, a second piston in said cylinder between the first piston and said other end wall, spring means bearing between said second piston and said other end wall, a second check valve in the second piston arranged to admit air under pressure between said pistons, a third check valve in said one end wall, said cylinder being formed with a passage connecting the intermediate portion thereof with said third check valve, said third check valve being arranged to open into the water storage tank responsive to a predetermined value of air pressure in the intermediate portion of the cylinder, a float pivoted to said third piston and extending through said conduit means, valve means carried by said first piston and controlled by said float, said cylinder being formed with an exhaust port communicating with said valve means, said valve means being arranged to open when the water in said water tank is below a predetermined level and when the first piston is moved inwardly to a predetermined position in the cylinder and to remain closed after the water has risen above said predetermined level in the tank.

3. An air volume and pressure controlling device for a water storage tank comprising a cylinder, conduit means at one end wall of the cylinder arranged to be connected to the upper portion of a water storage tank, an air intake check valve in the other end wall of the cylinder, a first piston in said cylinder adjacent to said one end wall, a second piston in said cylinder between the first piston and said other end wall, spring means bearing between said second piston and said other end wall, a second check valve in said second piston arranged to admit air under pressure between said pistons, a third check valve in said one end wall, said cylinder being formed with a passage connecting the intermediate portion thereof with said third check valve, said third check valve being arranged to open into the water storage tank responsive to a predetermined value of air pressure in the intermediate portion of the cylinder, a float pivoted to said first piston and extending through said conduit means, said first piston being formed with a longitudinal recess and a passage connecting said recess to the forward end of the first piston, a valve in the forward end of said last-named passage controlled by said float and arranged to open only when the water in the tank is below a predetermined level, an exhaust fitting in the cylinder wall located in the rear portion of said recess, and another valve in the rear end of said last-named passage having a control element engageable with said exhaust fitting and arranged to open said another valve when said first piston is moved rearwardly to a predetermined position in said cylinder.

No references cited.